United States Patent
Saunders et al.

(10) Patent No.: US 10,634,424 B2
(45) Date of Patent: Apr. 28, 2020

(54) OIL MANAGEMENT FOR MICRO BOOSTER SUPERMARKET REFRIGERATION SYSTEM

(71) Applicant: Emerson Climate Technologies, Inc., Sidney, OH (US)

(72) Inventors: Michael A. Saunders, Sidney, OH (US); Rajan Rajendran, Cenerville, OH (US); Scott Fraser, Sidney, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 133 days.

(21) Appl. No.: 15/868,712

(22) Filed: Jan. 11, 2018

(65) Prior Publication Data

US 2018/0195781 A1    Jul. 12, 2018

Related U.S. Application Data

(60) Provisional application No. 62/445,580, filed on Jan. 12, 2017.

(51) Int. Cl.
*F25D 29/00* (2006.01)
*F25B 5/02* (2006.01)
(Continued)

(52) U.S. Cl.
CPC .............. *F25D 29/008* (2013.01); *F25B 1/10* (2013.01); *F25B 5/02* (2013.01); *F25B 7/00* (2013.01);
(Continued)

(58) Field of Classification Search
CPC .... F25B 7/00; F25B 1/10; F25B 43/02; F25B 49/02; F25B 2400/075; F25B 41/04;
(Continued)

(56) References Cited

U.S. PATENT DOCUMENTS 4,326,387 A    4/1982  Friedman
4,530,215 A *  7/1985  Kramer ................. F25B 31/002
                                                      62/468

(Continued)

FOREIGN PATENT DOCUMENTS

EP          2088388 A1    8/2009
EP          3024107 A1 *  5/2016  ............. F25D 29/00
KR    20130081403 A    7/2013

OTHER PUBLICATIONS

International Search Report of the ISA/KR for International Application No. PCT/US2018/013603 dated Apr. 27, 2018.

(Continued)

*Primary Examiner* — Kun Kai Ma
(74) *Attorney, Agent, or Firm* — Harness, Dickey & Pierce, P.L.C.

(57) ABSTRACT

A refrigeration system includes first and second compressors and an oil separator. The oil separator includes an inlet for receiving refrigerant and oil from the first compressor, a refrigerant outlet, and an oil outlet. The oil separator separates the oil from the refrigerant. A portion of the oil separator below a horizontal plane intersecting the refrigerant outlet collects separated oil and has a volume equal to a first compressor oil supply. The first compressor oil supply is greater than or equal to 100% and less than or equal to 250% of a first compressor initial oil charge. The first compressor receives oil from the oil outlet when an amount of oil in the portion is less than or equal to the first compressor oil supply. The second compressor receives oil from the refrigerant outlet when the amount of oil in the portion is greater than the first compressor oil supply.

16 Claims, 4 Drawing Sheets

(51) Int. Cl.
*F25B 1/10* (2006.01)
*F25B 43/02* (2006.01)
*F25B 7/00* (2006.01)
*F25B 41/04* (2006.01)
*F25B 49/02* (2006.01)
*F25B 40/00* (2006.01)

(52) U.S. Cl.
CPC .............. *F25B 41/04* (2013.01); *F25B 43/02* (2013.01); *F25B 49/02* (2013.01); *F25B 40/00* (2013.01); *F25B 41/043* (2013.01); *F25B 2400/0401* (2013.01); *F25B 2400/075* (2013.01); *F25B 2400/13* (2013.01); *F25B 2400/22* (2013.01); *F25B 2600/2501* (2013.01); *F25B 2600/2513* (2013.01); *F25B 2700/197* (2013.01); *F25B 2700/21152* (2013.01); *F25D 2400/14* (2013.01); *F25D 2400/36* (2013.01); *F25D 2700/10* (2013.01)

(58) Field of Classification Search
CPC .......... F25B 5/02; F25B 41/043; F25B 40/00; F25B 2700/21152; F25B 2400/0401; F25B 2600/2501; F25B 2700/197; F25B 2400/22; F25D 2700/10; F25D 2400/14
See application file for complete search history.

(56) References Cited

U.S. PATENT DOCUMENTS

| | | | | |
|---|---|---|---|---|
| 5,094,598 | A * | 3/1992 | Amata | F04B 39/0207 417/533 |
| 5,440,894 | A * | 8/1995 | Schaeffer | F25B 1/00 62/203 |
| 5,685,168 | A * | 11/1997 | Sada | F04B 39/0207 62/473 |
| 6,047,557 | A | 4/2000 | Pham et al. | |
| 7,386,994 | B2 | 6/2008 | Chang et al. | |
| 9,416,993 | B2 * | 8/2016 | Hong | F25B 13/00 |
| 9,625,183 | B2 | 4/2017 | Wallace et al. | |
| 2003/0066302 | A1 * | 4/2003 | Ueno | F04B 39/0207 62/192 |
| 2005/0235660 | A1 | 10/2005 | Pham | |
| 2005/0279111 | A1 * | 12/2005 | Moriwaki | F04B 39/0207 62/193 |
| 2006/0117776 | A1 * | 6/2006 | Choi | F25B 31/002 62/228.5 |
| 2007/0119196 | A1 * | 5/2007 | Wellman | F25B 47/022 62/151 |
| 2008/0087031 | A1 * | 4/2008 | Park | F25B 13/00 62/175 |
| 2008/0092572 | A1 * | 4/2008 | Kim | F25B 13/00 62/160 |
| 2009/0107169 | A1 * | 4/2009 | Yoon | F25B 31/004 62/468 |
| 2010/0186439 | A1 | 7/2010 | Ogata et al. | |
| 2011/0155816 | A1 * | 6/2011 | Jeong | F25B 31/004 236/92 B |
| 2011/0239667 | A1 * | 10/2011 | Won | F25B 31/004 62/84 |
| 2012/0023978 | A1 | 2/2012 | Chae et al. | |
| 2012/0186284 | A1 | 7/2012 | Choi et al. | |
| 2012/0216551 | A1 | 8/2012 | Minor et al. | |
| 2012/0291464 | A1 * | 11/2012 | Yoon | F25B 31/004 62/126 |
| 2012/0304685 | A1 * | 12/2012 | Kiguchi | F24F 1/26 62/468 |
| 2013/0098092 | A1 * | 4/2013 | Wakamoto | F25B 1/10 62/278 |
| 2014/0037484 | A1 | 2/2014 | Fraser et al. | |
| 2014/0056725 | A1 * | 2/2014 | Fraser | F04C 28/02 417/53 |
| 2014/0208785 | A1 * | 7/2014 | Wallace | F25B 9/008 62/115 |
| 2014/0326008 | A1 * | 11/2014 | Yoon | F25B 43/02 62/126 |
| 2015/0007598 | A1 | 1/2015 | Choi et al. | |
| 2015/0044070 | A1 * | 2/2015 | Zhang | F25B 31/002 417/228 |
| 2015/0114013 | A1 * | 4/2015 | Joo | F25B 31/004 62/84 |
| 2015/0168044 | A1 * | 6/2015 | Lim | F25B 41/003 62/117 |
| 2016/0178250 | A1 * | 6/2016 | Jeung | F25B 49/02 62/160 |
| 2016/0265821 | A1 * | 9/2016 | Kimura | F25B 13/00 |
| 2016/0313041 | A1 | 10/2016 | Pham et al. | |
| 2017/0108250 | A1 * | 4/2017 | Song | F25B 5/02 |
| 2018/0051921 | A1 | 2/2018 | Ho et al. | |
| 2018/0195773 | A1 | 7/2018 | Saunders et al. | |
| 2018/0195794 | A1 | 7/2018 | Saunders et al. | |

OTHER PUBLICATIONS

Written Opinion of the ISA/KR for International Application No. PCT/US2018/013603 dated Apr. 27, 2018.
International Search Report of the ISA/KR for International Application No. PCT/US2018/013608 dated Apr. 23, 2018.
Written Opinion of the ISA/KR for International Application No. PCT/US2018/013608 dated Apr. 23, 2018.
Non-Final Office Action regarding Application No. 15/868,693 dated Aug. 9, 2019.
European Communication under Rules 161(2) and 162 EPC dated Aug. 21, 2019 in European Application 18738742.8.
European Communication under Rules 161(2) and 162 EPC dated Aug. 21, 2019 in European Application 18738609.9.
Restriction Requirement regarding U.S. Appl. No. 15/868,636 dated Aug. 29, 2019.

* cited by examiner

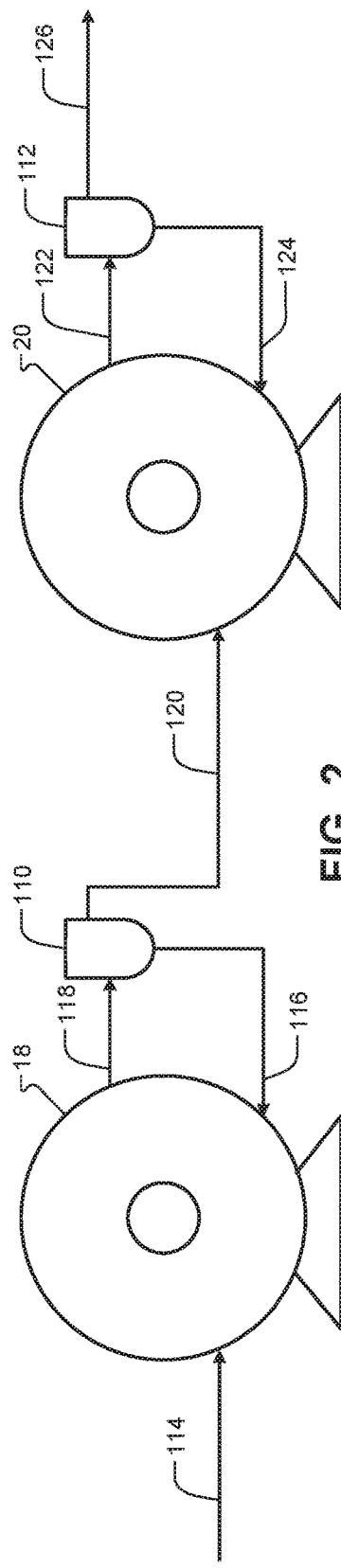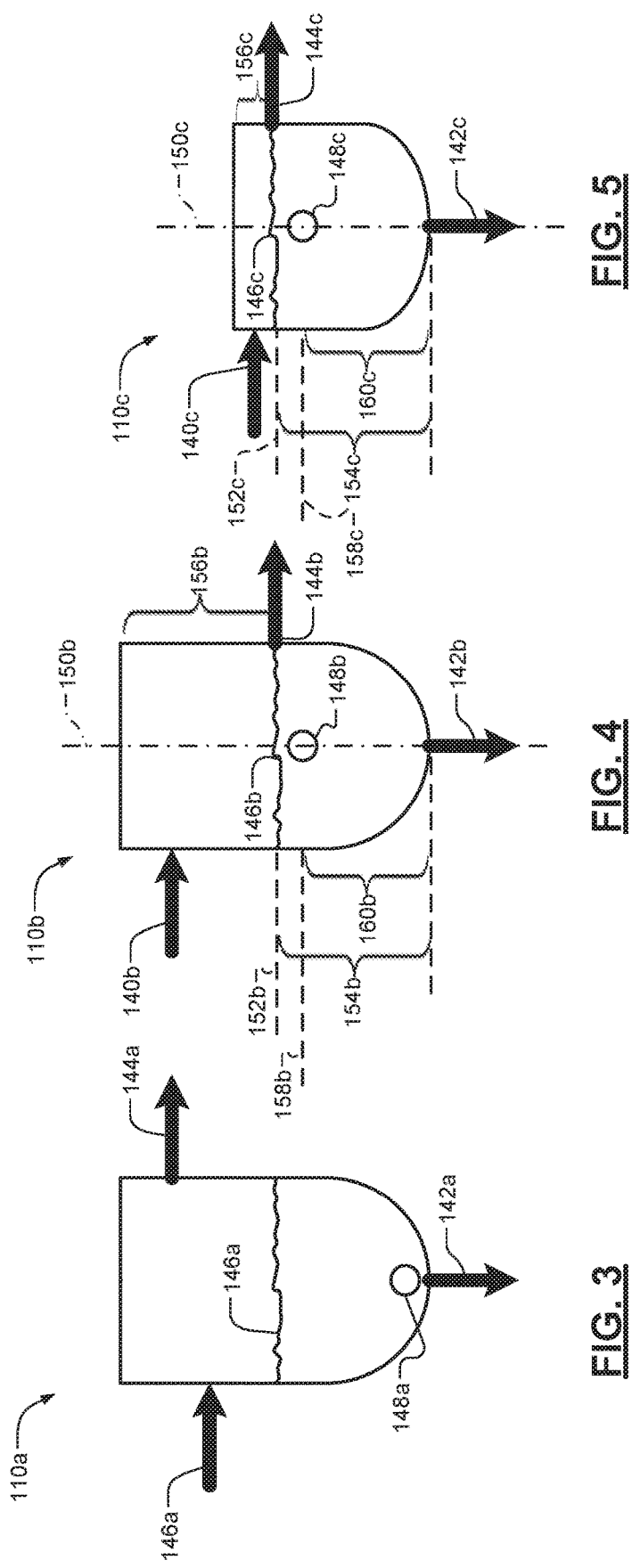

OIL MANAGEMENT FOR MICRO BOOSTER SUPERMARKET REFRIGERATION SYSTEM

CROSS-REFERENCE TO RELATED APPLICATIONS

This application claims the benefit of U.S. Provisional Application No. 62/445,580, filed on Jan. 12, 2017. The entire disclosure of the above application is incorporated herein by reference.

FIELD

The present disclosure relates to oil management for a micro booster supermarket refrigeration system.

BACKGROUND

This section provides background information related to the present disclosure which is not necessarily prior art.

Supermarket refrigeration systems may include low temperature refrigeration cases and medium temperature refrigeration cases. Refrigeration cases are cooled by evaporators that discharge low pressure refrigerant vapor to respective compressors. Medium temperature evaporators discharge an intermediate pressure refrigerant to a medium temperature compressor and the medium temperature compressor discharges a high pressure refrigerant. Low temperature evaporators discharge a low pressure refrigerant to a low temperature compressor and the low temperature compressor discharges a high pressure refrigerant. Thus, the low temperature compressor operates with a relatively high compression ratio because it needs to bring the refrigerant to a condensing pressure.

Compressors may lubricated by oil, which is circulated to various compressor components. When a compressor operates, small amounts of oil may be pumped out of the compressor along with the compressed refrigerant. Too much oil flow through the refrigeration system (e.g., condenser, evaporator) may interfere with efficient operation of the refrigeration system. Thus, compressors may include oil separators to remove oil from refrigerant. The oil separator may return the oil to the compressor as needed while allowing the refrigerant to flow through the refrigeration system.

SUMMARY

This section provides a general summary of the disclosure, and is not a comprehensive disclosure of its full scope or all of its features.

In one embodiment, the present disclosure provides a refrigeration system. The refrigeration system includes at least one first compressor, at least one second compressor, a condenser, a first evaporator, a second evaporator, and a first oil separator. The at least one first compressor is fluidly connected to a first suction line and a first discharge line. The at least one second compressor is fluidly connected to a second suction line and a second discharge line. The second suction line is fluidly connected to the first discharge line. The condenser is operable to receive refrigerant from the at least one second compressor. The first evaporator is operable to receive refrigerant from the condenser and discharge refrigerant to the first suction line. The second evaporator is operable to receive refrigerant from the condenser and discharge refrigerant to the second suction line. The first oil separator includes a first fluid inlet, a first refrigerant outlet, a first oil outlet, and a first horizontal plane. The first inlet is fluidly connected to the first discharge line. The first refrigerant outlet is fluidly connected the second suction line. The first oil outlet is fluidly connected to a first sump of the at least one first compressor. The first horizontal plane intersects the first refrigerant outlet. The first oil separator is adapted to receive refrigerant and oil from the at least one first compressor through the first inlet. The first oil separator is further adapted to separate at least a portion of the oil from the refrigerant. A first portion of the first oil separator below the first horizontal plane is configured to collect separated oil. The first portion is sized to have a volume equal to a first compressor oil supply. The first compressor oil supply is greater than or equal to about 100% of a first compressor initial oil charge and less than or equal to about 250% of the first compressor initial oil charge. The at least one first compressor is configured to receive oil from the first oil outlet when an amount of oil in the first portion is less than or equal to the first compressor oil supply. The at least one second compressor is configured to receive oil from the first refrigerant outlet when the amount of oil in the first portion is greater than the first compressor oil supply.

In another embodiment, the present disclosure provides another refrigeration system including at least one first compressor, at least one second compressor, a condenser, a first evaporator, a second evaporator, a first valve, and an oil line. The at least one first compressor is fluidly connected to a first suction line and a first discharge line. The at least one second compressor is fluidly connected to a second suction line and a second discharge line. The second suction line is fluidly connected to the first discharge line. The condenser is operable to receive refrigerant from the at least one second compressor. The first evaporator is operable to receive refrigerant from the condenser and discharge refrigerant to the first suction line. The second evaporator is operable to receive refrigerant from the condenser and discharge refrigerant to the second suction line. The first valve is disposed between the first evaporator and the first suction line. The oil line extends between a first oil sump of the at least one first compressor and a second oil sump of the at least one second compressor. The first suction line receives refrigerant from the first evaporator when the first valve is in a first position. The second suction line receives refrigerant from the first evaporator when the first valve is in a second position. The at least one first compressor is bypassed when the first valve is in the second position.

In still another embodiment, the present disclosure provides another refrigeration system. The refrigeration system includes at least one first compressor, at least one second compressor, a condenser, a first evaporator, a second evaporator, and a valve. The at least one first compressor is fluidly connected to a first suction line and a first discharge line. The at least one first compressor includes a first oil separator. The at least one second compressor is fluidly connected to a second suction line and a second discharge line. The second suction line is fluidly connected to the first discharge line. The at least one second compressor includes a second oil separator. The condenser is operable to receive refrigerant from the at least one second compressor. The first evaporator is operable to receive refrigerant from the condenser and discharge refrigerant to the first suction line. The second evaporator is operable to receive refrigerant from the condenser and discharge refrigerant to the second suction line. The valve disposed between the first evaporator and the first suction line. The first suction line receives refrigerant from the first evaporator when the valve is in a first position. The second suction line receives refrigerant from the first evaporator when the valve is in a second position. The at least one first compressor is bypassed when the valve is in the second position. Both of the first oil separator and the second oil separator are critically charged.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2 is a schematic of first and second compressors and respective first and second oil separators of the micro booster refrigeration system of FIG. 1;

FIG. 3 is an example oil separator;

FIG. 4 is another oil separator according to the present disclosure;

FIG. 5 is yet another oil separator according to the principles of the present disclosure;

Corresponding reference numerals indicate corresponding parts throughout the several views of the drawings.

DETAILED DESCRIPTION

Example embodiments will now be described more fully with reference to the accompanying drawings.

Figure 1:
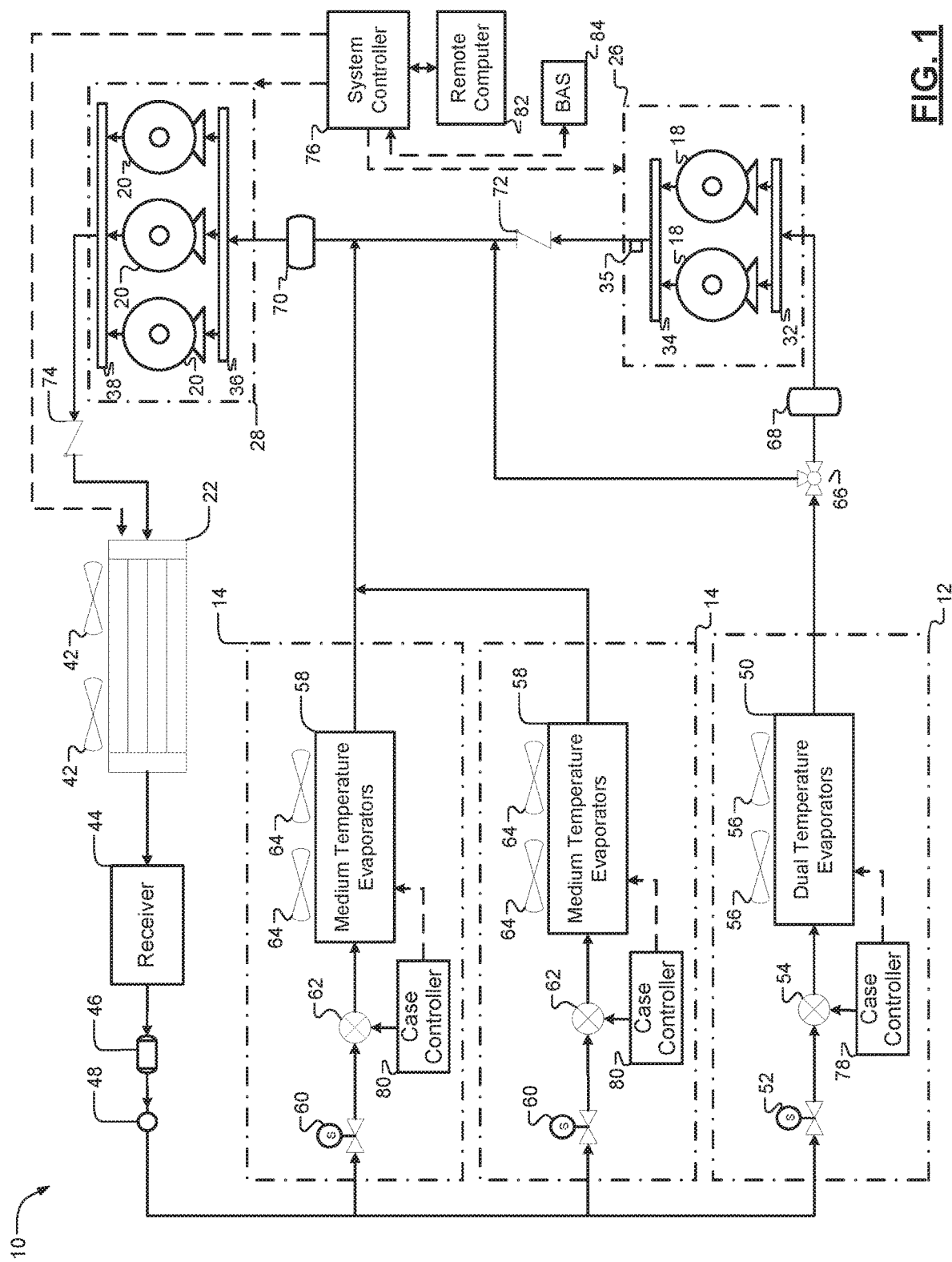
FIG. 1 is a schematic of a micro booster refrigeration system according to the present disclosure.

With reference to FIG. 1, an example micro booster supermarket refrigeration system 10 is provided. The micro booster supermarket refrigeration system 10 includes at least one dual temperature refrigeration case 12 that can be run at low temperatures or medium temperatures and at least one medium temperature refrigeration case 14 that can be run at medium temperatures. Although FIG. 1 depicts one dual temperature refrigeration case 12 and two medium temperature refrigeration cases 14, the refrigeration system 10 can be configured as large or small as needed. Thus, other numbers of dual and medium temperature refrigeration cases 12, 14 are contemplated within the scope of the present disclosure. Low temperatures may be used for frozen foods and medium temperatures can be used for meat and dairy, by way of non-limiting example. The dual and medium temperature refrigeration cases 12, 14 may be disposed in a retail area.

The refrigeration system 10 further includes at least one first compressor 18, at least one second compressor 20, and a condenser 22. The first compressors 18 may be disposed on a first compressor rack 26. The second compressors may be disposed on a second compressor rack 28. The compressors 18, 20 may be fixed capacity or variable capacity compressors. For example, each compressor rack 26, 28 may include at least one variable capacity compressor and at least one fixed capacity compressor.

The first compressors 18 may be connected by a first suction header or manifold 32 and a first discharge header or manifold 34. A first discharge temperature sensor 35 may be disposed downstream of the first discharge header 34 to detect a temperature of refrigerant vapor exiting the first compressors 18. The second compressors 20 may be connected by a second suction header or manifold 36 and a second discharge header or manifold 38. When single first or second compressors 18, 20 are used, the suction and discharge headers or manifolds 32, 36, 34, 38 can be the suction and discharge inlets, respectively, connected to the suction and discharge lines, respectively. The first compressor rack 26 may be connected in series with the second compressor rack 28 such that the refrigerant discharged from the first compressor rack 26 is received on a suction side of the second compressor rack 28.

The first compressors 18 receive a refrigerant vapor having a first or low pressure and discharge a refrigerant vapor having a second or intermediate pressure. The second pressure is higher than the first pressure. The second compressors 20 receive the second or intermediate pressure refrigerant vapor from the first compressors 18 and discharge a refrigerant vapor having a third or high pressure. The third pressure is higher than the second pressure. As will be discussed in greater detail below, the first compressors 18 may discharge refrigerant vapor directly into the second compressors 20.

The condenser 22 receives the high pressure refrigerant vapor from the second compressor rack 28. The condenser 22 may include one or more fans 42. The condenser 22 removes heat from the high pressure refrigerant vapor and discharges a high pressure, low temperature refrigerant liquid. The refrigerant is received by a receiver 44. The receiver 44 discharges the refrigerant to a filter-drier 46 to remove moisture, dirt, metal, and other impurities. The filter-drier 46 discharges refrigerant to a sight glass 48, which indicates refrigerant level. Refrigerant discharged from the sight glass 48 is received by the dual temperature refrigeration case 12 and the medium temperature refrigeration cases 14. The receiver 44, filter-drier 46, and sight glass 48 may be omitted from the refrigeration system 10 within the scope of the present disclosure.

The dual temperature refrigeration case 12 can be operated within a first or low temperature range or a second or medium temperature range that is higher than the first temperature range. The dual temperature refrigeration case 12 includes an evaporator 50, a solenoid valve 52, an expansion valve 54, and one or more fans 56. The medium temperature cases 14 can be operated within the second or medium temperature range. The medium temperature refrigeration cases 14 each include an evaporator 58, a solenoid valve 60, an expansion vale 62, and one or more fans 64. The solenoid valves 52, 60, which receive refrigerant from the sight glass 48, may be used to prevent backflow. The expansion valves 54, 62 receive refrigerant from respective solenoid valves 52, 60. The expansion valves 54, 62 receive a high pressure liquid and decrease the pressure of the refrigerant to discharge a low pressure liquid. The expansion valves 54, 62 are used to control the amount of refrigerant that is discharged to the respective evaporators 50, 58. Thus, the expansion valves 54, 62 are used to control the temperature ranges of the dual and medium temperature refrigeration cases 12, 14, respectively. The expansion valves 54, 62 may be thermostatic expansion valves (TXV), pulse type solenoids, or electronic expansion valves (EXV), by way of non-limiting example.

The evaporators 50, 58 receive low pressure refrigerant liquid from the respective expansion valves 54, 62 and discharge low pressure refrigerant vapor. More specifically, the liquid refrigerant enters the evaporators 50, 58 and absorbs heat from the respective refrigeration case 12, 14 to vaporize.

Refrigerant discharged from the evaporator 50 of the dual temperature refrigeration case 12 is received by a bypass valve 66, which may be a 3-way ball valve. When the bypass valve 66 is in a first position, it discharges refrigerant to a first accumulator 68 upstream of the first compressors 18. When the bypass valve 66 is in a second position, it discharges refrigerant to the suction header 36 of the second compressor rack 28. Thus, in the first position, the bypass valve 66 is used to run the dual temperature refrigeration case 12 within a low temperature range. In the second position, the bypass valve 66 is used to bypass the first compressor rack 26, thereby enabling operation of the dual temperature refrigeration case 12 within a medium temperature range. Although a bypass valve 66 is shown as a 3-way valve, other configurations to enable bypass of the first compressors 18, such as a series of solenoid valves, are contemplated within the scope of the present disclosure.

The first accumulator 68 receives refrigerant from the bypass valve 66 when the bypass valve 66 is in the first position. The first accumulator 68 discharges refrigerant to the first suction header 32 of the first compressor rack 26. The first accumulator 68 is used to prevent liquid refrigerant from flowing to the first compressors 18.

Refrigerant discharged from the evaporators 58 of the medium temperature refrigeration cases 14 is received by a second accumulator 70 upstream of the second compressors 20. The second accumulator 70 prevents liquid refrigerant from flowing to the second compressors 20. The second accumulator 70 discharges refrigerant to the suction header 36 of the second compressor rack 28.

The refrigeration system 10 may include various valves controlled by various associated controllers, to monitor and regulate the various temperatures and pressures within the refrigeration system 10 to maintain efficient and desirable operation. Specifically, the refrigeration system includes check valves 72, 74 disposed downstream of the first and second compressors 18, 20, respectively, to prevent backflow to the compressors 18, 20. The refrigeration system 10 may also include additional valves (not shown), such as solenoid valves, evaporator pressure regulator (EPR) valves, or electronic evaporator pressure regulator (EEPR) valves. For example, EPR valves may be used downstream of the medium temperature refrigeration cases 14 to operate the medium temperature refrigeration cases 14 at different temperatures within the medium temperature range. The valves shown in FIG. 1 are merely exemplary, and other types of valves may be used within the scope of the present disclosure. Moreover, certain valves may be omitted from the refrigeration system 10.

The first discharge header 34 of the first compressors 18 discharges to the second suction header 36 of the second compressors 20. Thus, the first compressors 18 do not compress the refrigerant to the highest condensing pressure, but rather to an intermediate pressure. The second compressors 20 compress the refrigerant from the intermediate pressure discharged by the first compressors 18 and the medium temperature evaporators 58 to a high pressure or condensing pressure. The relatively low discharge pressure of the first compressors 18 enables the use of medium temperature compressors in the first compressor rack 26. The associated relatively low discharge temperature of the first compressors 18 eliminates the need for a desuperheater, such as liquid injection, or any other means of cooling, resulting in a cost savings. Although the dual temperature refrigeration case 12 is capable of cooling within a low temperature range, all loads on the system are treated as medium loads from the perspective of the second compressor rack 28.

The compression ratio of the first compressors 18 is low as compared to a low temperature compressor for a non-booster low temperature refrigeration system. The compression ratio for the first compressors may by greater than or equal to about two (2) and less than or equal to about three (3), by way of non-limiting example. The compression ratio for the second compressors may be greater than or equal to about four (4) and less than or equal to about five (5), by way of non-limiting example. Because all compressors 18, 20 operate at relatively low compression ratios, maintenance and operation of the refrigeration system 10 is simplified compared to a non-booster refrigeration system with separate low temperature and medium temperature refrigeration cycles.

Unlike refrigeration systems that use a secondary refrigerant, such as glycol, the refrigeration system 10 of the present disclosure may be operated without pumps and certain other complexities. Moreover, the refrigeration system 10 uses a single refrigerant for both the low temperature and high temperature operations. Various refrigerants may be used in the refrigeration system 10. In contrast to a non-booster refrigeration with separate low temperature and medium temperature refrigeration cycles, a low pressure refrigerant may be used. Suitable low pressure refrigerants include R-134a, R-450A, R-513A, and R-515A, by way of non-limiting example. Low pressure refrigerants generally have relatively low GWPs. Thus, the use of low pressure refrigerants in the refrigeration system 10 of the present disclosure may result in lower direct emissions compared to other refrigeration systems. Moreover, higher displacement compressors having higher efficiencies can be used with low pressure refrigerants. Finally, the low temperature refrigerant circulated in the refrigeration system 10 may also be used in other refrigeration systems throughout the store. Although the use of specific low pressure refrigerants is discussed above, the refrigeration system 10 may be used with other refrigerants, including other low pressure refrigerants and non-low pressure refrigerants.

The dual temperature refrigeration case 12 may be used as a low temperature refrigeration case operating within a first temperature range or a medium temperature case operating within a second temperature range that is higher than the first temperature range. The medium temperature refrigeration cases 14 operate within the medium temperature range. The dual temperature refrigeration case 12 may be toggled from operation within the first or low temperature range to operation within the second or medium temperature range by shutting off and bypassing the first compressors 18 by placing the bypass valve 66 in the first position.

The compressors 18, 20 can include scroll compressors, reciprocating compressors, or rotary vane compressors, for example, and/or any other type of compressor. Scroll compressors generally operate efficiently at low condensing pressures. Thus, scroll compressors are particularly suitable as first compressors 18. Because of the low condensing capability, scroll compressors operate at corresponding low discharge temperatures. The use of scroll compressors as first compressors 18 is advantageous in the micro booster refrigeration system 10 because it may eliminate the need for a desuperheater or other means of cooling at the first discharge header 34. In contrast, when a compressor operating at higher discharge temperatures and pressures is used as the first compressor 18, a desuperheater (not shown) is typically disposed downstream of the first compressor 18 and upstream of the second compressor 20 to lower the refrigerant temperature before it enters the second suction header 36.

One or more of the first compressors 18 and/or the second compressors 20 may be a variable capacity compressor. A variable capacity compressor may be or include a multi-stage compressor, a group of independently operable compressors, a multi-speed or variable-speed compressor (having a variable-speed or multi-speed motor), a compressor having modulated suction (e.g., blocked suction), a compressor having fluid-injection (e.g., an economizer circuit), a pulse-width-modulated scroll compressor configured for scroll separation (e.g., a digital scroll compressor), a compressor having variable-volume-ratio valves configured to leak intermediate-pressure working fluid, or a compressor having two or more of the above capacity modulation means. It will be appreciated that the compressors 18, 20 could include any other additional or alternative structure for varying its capacity and/or the operating capacity of the refrigeration system 10. As will be discussed in greater detail below, the first compressors 18 generally operate a predictable suction and discharge pressures. Variable capacity compressors may nonetheless be useful in circumstances where loads vary. For example, loads on the first compressor 18 may vary during a defrost operation of the dual temperature evaporator 50.

Although a single dual temperature refrigeration case 12 is shown, the refrigeration system 10 may alternatively include a plurality of dual temperature refrigeration cases 12. The first compressor rack 26 may be disposed in a retail area near the dual temperature refrigeration cases 12. For example, the dual temperature refrigeration case 12 may be disposed adjacent to, on top of, or inside of one of the dual temperature refrigeration cases 12. The first compressor rack 26 may be used to cool the entire plurality of dual temperature refrigeration cases 12. The second compressor rack 28 may be located in a remote area away from the retail area. For example, the second compressor rack 28 may be disposed in a mechanical room, in a storage room, or on a roof.

The refrigeration system 10 may require only a single set of pipes to run from the first compressor rack 26 in the retail area to the second compressor rack 28 in the remote area. Because of the relatively low discharge temperature of the first compressors 18, medium temperature refrigerant pipes may be used. Thus, the equipment and installation costs of the refrigeration system 10 may be reduced when compared to a direct expansion system having both low and medium temperature refrigeration pipes running between the retail area and the remote area. Equipment and operation costs are also improved compared to a secondary system employing pumps and heat exchangers and to a micro-distributed system requiring distinct compressors for both low temperature and medium temperature loads. Finally, efficiency of the refrigeration system 10 is improved compared to other refrigeration system because of the decrease in equipment, minimizing energy losses, and the decrease in piping, minimizing pressure drop between refrigeration stages.

The refrigeration system 10 includes various controllers that monitor operating and environmental conditions, including temperatures and pressures, and control the various system components according to programmed control strategies. Specifically, a system controller 76 controls the compressor racks 26, 28 by activating, deactivating, and adjusting the compressors 18, 20 of the compressor racks 26, 28. The system controller 76 also controls the condenser 22 by activating, deactivating, and adjusting fans 42 of the condenser 22. The system controller 76 may be, for example, an Einstein RX Refrigeration Controller, an Einstein BX Building/HVAC Controller, an E2 RX Refrigeration Controller, an E2 BX HVAC Controller, or an E2 CX Convenience Store Controller, available from Emerson Climate Technologies Retail Solutions, Inc., of Kennesaw, Ga., or a compressor rack controller, such as the XC series controller, available from Dixell S.p.A., of Pieve d'Alpago (Belluno), Italy, with appropriate programming in accordance with the present disclosure. Alternatively, the first rack 26 may have a separate controller (not shown) that is not operated by the system controller 76.

The system controller 76 may include a user interface, such as a touchscreen or a display screen and user input device, such as a keyboard, to communicate with a user. For example, the system controller 76 may output system parameters, such as system operating temperatures or pressures, and/or system set points to a user. Further, the system controller 76 may receive user input modifying the system set points or control algorithms.

The refrigeration system 10 also includes case controllers 78, 80 for controlling the dual temperature evaporators 50 and medium temperature evaporators 58 and the associated expansion valves 54, 62. For example, the case controllers 78, 80 may activate, deactivate, and adjust the evaporator fans of the evaporators 24, 26. The case controllers may also adjust the expansion valves 54, 62. The case controllers 78, 80 may be XM678 Case Controllers, available from Dixell S.p.A., of Pieve d'Alpago (Belluno), Italy, with appropriate programming in accordance with the present disclosure. Further, the case controllers 78, 80 may include a user interface, such as a touchscreen or a display screen and user input device, such as a keyboard, to communicate with a user. For example, the case controllers 78, 80 may output system parameters, such as system operating temperatures or pressures, and/or system set points to a user. Further, the case controllers 78, 80 may receive user input modifying the system set points or control algorithms.

Each of the controllers shown in FIG. 1 is operable to communicate with each other. For example, the system controller 76 may adjust operation or set points of the case controllers 78, 80.

Additionally, a remote computer 82 may be connected to the system controller 76 so that a remote user can log into the system controller 76 and monitor, control, or adjust operation of any of the controllers, including the system controller 76 and the case controllers 78, 80.

Additionally, the system controller 76 may be in communication with a building automation system (BAS) 84. The BAS 84 may be connected to additional temperature and pressure sensors and may monitor and store additional temperature and pressure data that can be accessed by the system controller 76 in the event of a sensor failure. The remote computer 82 can also be connected to the BAS 84 so that a remote user can log into the BAS 84 and monitor, control, or adjust operation of any of the controllers, including the system controller 76 and the case controllers 78, 80.

Although system controller 76 and case controllers 78, 80 are shown in FIG. 1, various controller configurations may be used within the scope of the present disclosure. Control can occur anywhere in the refrigeration system 10. Thus, the controls for the refrigeration system 10 can be accomplished with centralized control or distributed controls. In distributed control systems, case control can be accomplished with either temperature or pressure controls.

The refrigeration system 10 may include compressor synchronization. For example, the system controller 76 may monitor a pressure of the second suction header 36 or the first discharge header 34 and turn on the second compressors 20 when the pressure of the second suction header 36 or the first discharge header 34 exceeds a predetermined value. The predetermined value is set such that it indicates that the first compressors 18 are running.

Digital compressors may be used to facilitate capacity control. If digital compressors are used for first or second compressors 18, 20, the first and second compressors 18, 20 can be synchronized with associated expansion valves 54, 62 to minimize pressure fluctuations and achieve better temperature and pressure control. Operation of the first compressor rack 26 can be synchronized back to the second compressor rack 28 to optimize proper modulation of the compressors 18, 20. The second compressors 20 can be closely modulated to maintain stable pressures by controlling the second compressors 20 based on a detected temperature of the dual temperature refrigeration case 12, a detected temperature of the medium temperature refrigeration case 14, or a detected temperature of the first discharge header 34. Quicker reaction control is enabled by minimal piping of the refrigeration system 10 of the present disclosure compared to other refrigeration systems.

Control of the dual temperature refrigeration case 12 can be achieved using a supervisory or other control that can shut off the first compressors 18 and open the bypass valve 66. The control would also change the temperature range of the dual temperature refrigeration case 12 and make the appropriate adjustments to the expansion valve 54 to control case temperature and proper superheat.

As discussed above, compressors may include oil separators for separating lubricant oil from refrigerant exiting a compressor, and returning the oil to the compressor. An appropriate size oil separator for a system may be determined based on a mass flow rate of refrigerant through the compressor (e.g., in lb/min), a discharge refrigerant density (e.g., in lb/ft$^3$), and a size of the refrigeration system by mass of refrigerant (e.g., in tons). In one example, a discharge volumetric flow rate or discharge cubic feet per minute (DCPM) is calculated by dividing the mass flow rate by the discharge gas density. The DCFM is multiplied by the size of the system to calculate a volumetric flow rate or cubic feet per minute (CFM) of the system. Commercial oil separators and handle various CFMs. An appropriate oil separator is selected based on the calculated CFM.

Typically, an oil separator may be disposed downstream of a compressor and upstream of a condenser to ensure that refrigerant received by the condenser is substantially free of oil. In a micro booster configuration similar to the refrigeration system 10 of FIG. 1, refrigerant flows from the first discharge header 34 to the second suction header 36. Thus, oil may also flow between the first compressor 18 and the second compressor 20. It is possible for oil to accumulate in one of the first compressor 18 or the second compressor 20 (e.g., in a respective oil sump) through continued operation of the refrigeration system 10, thereby depriving the other of the first compressor 18 and the second compressor 20 of an adequate oil supply. Thus, for efficient operation of the refrigeration system 10, it is advantageous to ensure that both the first compressor 18 and the second compressor 20 have an adequate supply of oil.

With reference to FIG. 2, the first compressor 18 includes a first oil separator 110 and the second compressor includes a second oil separator 112. Refrigerant enters the first compressor at 114 (i.e., first suction line from the first evaporator 50). After the refrigerant is compressed by the first compressor 18, the refrigerant may include a small amount of oil. The refrigerant including oil may exit the first compressor 18 and enter the first oil separator 110 at 116. The first oil separator 110 may separate at least some of the oil from the refrigerant. Separated oil may be sent from the first oil separator 110 back to the first compressor 18 at 118. Refrigerant having a reduced amount of oil (e.g., substantially free of oil), may exit the first oil separator 110 and enter the second compressor 20 at 120 (i.e., the second suction line).

After the refrigerant is compressed by the second compressor 20, the refrigerant may include a small amount of oil. The refrigerant including oil may exit the second compressor 20 and enter the second oil separator 112 at 112. The second oil separator 112 may separate at least some of the oil from the refrigerant. Separated oil may be sent from the second oil separator 112 back to the second compressor 20 at 124. Refrigerant having a reduced amount of oil (e.g., substantially free of oil), may exit the second oil separator 112 at 126 (i.e., a second discharge line to the condenser 22).

To prevent oil from accumulating in one of the first compressor 18 and the second compressor 20 over time and depriving the other of the first compressor 18 and the second compressor 20 of adequate oil, the first and second oil separators 110, 112 may be critically charged. That is, the first and second oil separators 100, 112 may be completely filled with oil (e.g., a volume of the oil separator 110, 112 disposed below the respective refrigerant outlet 118, 122 may be completely filled with oil). For example, the first and second oil separators 110, 112 may be critically charged prior to operation of the compressors 18, 20. Any excess oil beyond the critical charge will "blow by" the oil separator 110, 112 with the refrigerant in the refrigerant outlet 120, 126. The critical charge of oil in the oil separators 110, 112 may ensure that both the first oil separator and the second oil separator 110, 112 are adequately supplied with oil during operation of the refrigeration system 10.

With reference to FIG. 3, an oil separator 110*a* is shown. The oil separator 110*a* includes an inlet 140*a*, an oil outlet 142*a*, and a refrigerant outlet 144*a*. Refrigerant and oil are received by the oil separator 110*a* at the inlet 140*a*. At least some of the oil is separated from the refrigerant in the oil separator 110*a*. For example, oil droplets may form on internal baffles or mesh (not shown) and fall to a bottom of the oil separator 110*a* by the force of gravity. Oil is returned to the compressor through the oil outlet 142*a*. Refrigerant gas that having a reduced amount of oil is directed through the refrigerant outlet 144*a* to exit the oil separator 110*a*.

The oil separator 110*a* may be sized so that an oil level 146*a* never reaches the refrigerant outlet 144*a*. More specifically, the oil separator 110*a* may have a volume that is larger than a volume of oil circulating through the compressor. The oil separator 110*a* may include a sight glass 148*a*. The sight glass 148*a* may be disposed near a bottom of the oil separator 110*a* so that the oil level 146*a* is visible when the oil separator 110*a* is almost empty (e.g., less than about 10% full of oil by volume). The oil separator 110*a* may be sized based on a mass flow rate of refrigerant through the compressor, a discharge refrigerant density, and a size of the refrigeration system by mass of refrigerant, as described above.

Referring to FIG. 4, another oil separator 110*b* according to certain aspects of the present disclosure is provided. The oil separator 110*b* may be used with a first compressor in a micro booster refrigeration system, such as the first compressor 18 of the refrigeration system 10. The oil separator 110*b* includes an inlet 140*b*, an oil outlet 142*b*, and a refrigerant outlet 144*b*. The oil separator 110*b* may also include an oil level 146b and a sight glass 148b. The oil separator 110b includes a vertical axis 150b and a first horizontal plane 152b. The vertical axis 150b is extends parallel to a direction of the force of gravity. The first horizontal plane 152b extends perpendicular to the vertical axis 150b and intersects the refrigerant outlet 144b. A first portion 154b of the oil separator 110b is disposed below the first horizontal plane 152b and a second portion 156b of the oil separator 110b is disposed above the first horizontal plane 152b.

During operation of the compressor, oil falls under the force of gravity and collects in the first portion 154b. The first portion 154b is sized to hold less than or equal to a first compressor oil supply. The first compressor oil supply may be a volume of oil sufficient to supply the first compressor 18 during operation of the first compressor 18. The first compressor oil supply may be defined as a percentage of the first compressor initial oil charge (i.e., a volume of initial oil charge in the first compressor). The first oil sump may be sized to contain the first compressor oil supply.

In various embodiments, the first compressor oil supply may be equal to greater than or equal to about 100% of the first compressor initial oil charge and less than or equal to about 300% the first compressor initial oil charge, optionally greater than or equal to about 100% of the first compressor initial oil charge and less than or equal to about 275% the first compressor initial oil charge, optionally greater than or equal to about 100% of the first compressor initial oil charge and less than or equal to about 250% of the first compressor initial oil charge, optionally greater than or equal to about 100% of the first compressor initial oil charge and less than or equal to about 240% of the first compressor initial oil charge, optionally greater than or equal to about 100% of the first compressor initial oil charge and less than or equal to about 230% of the first compressor initial oil charge, optionally greater than or equal to about 100% of the first compressor initial oil charge and less than or equal to about 225% of the first compressor initial oil charge, optionally greater than or equal to about 100% of the first compressor initial oil charge and less than or equal to about 220% of the first compressor initial oil charge, optionally greater than or equal to about 100% of the first compressor initial oil charge and less than or equal to about 215% of the first compressor initial oil charge, optionally greater than or equal to about 100% of the first compressor initial oil charge and less than or equal to about 210% of the first compressor initial oil charge, optionally greater than or equal to about 100% of the first compressor initial oil charge and less than or equal to about 205% of the first compressor initial oil charge, optionally greater than or equal to about 100% of the first compressor initial oil charge and less than or equal to about 200% of the first compressor initial oil charge, optionally greater than or equal to about 100% of the first compressor initial oil charge and less than or equal to about 195% of the first compressor initial oil charge, optionally greater than or equal to about 100% of the first compressor initial oil charge and less than or equal to about 190% of the first compressor initial oil charge, and optionally greater than or equal to about 100% of the first compressor initial oil charge and less than or equal to about 175% of the first compressor initial oil charge.

In various other embodiments, the first compressor oil supply may be equal to greater than or equal to about 150% the first compressor initial oil charge and less than or equal to about 250% of the first the first compressor initial oil charge, optionally greater than or equal to about 155% of the first compressor initial oil charge and less than or equal to about 245% of the first compressor initial oil charge, optionally greater than or equal to about 160% of the first compressor initial oil charge and less than or equal to about 240% the first compressor initial oil charge, optionally greater than or equal to about 165% the first compressor initial oil charge and less than or equal to about 235% of the first compressor initial oil charge, optionally greater than or equal to about 170% of the first compressor initial oil charge and less than or equal to about 230% of the first compressor initial oil charge, optionally greater than or equal to about 175% of the first compressor initial oil charge and less than or equal to about 225% of the first compressor initial oil charge, optionally greater than or equal to about 180% of the first compressor initial oil charge and less than or equal to about 220% of the first compressor initial oil charge, optionally greater than or equal to about 185% of the first compressor initial oil charge and less than or equal to about 215% of the first compressor initial oil charge, optionally greater than or equal to about 190% of the first compressor initial oil charge and less than or equal to about 210% of the first compressor initial oil charge, optionally greater than or equal to about 195% of a volume of the first compressor initial oil charge and less than or equal to about 205% of the first compressor initial oil charge, and optionally about 200% of the first compressor initial oil charge.

In various embodiments, the first compressor oil supply may be selected so that the oil separator 110b is critically charged. The refrigerant outlet 144b is disposed between the first and second portions 154b, 156b of the oil separator 110b.

As discussed above, during operation of the refrigeration system 10 (FIG. 1), oil can move between the first and second compressors 18, 20. Because of the placement of the refrigerant outlet 144b, the oil separator 110b for the first compressor 18 only holds enough oil to supply the first compressor 18. Any excess oil exits with the refrigerant to the second compressor 20. Thus, the location of the refrigerant outlet 144b on the oil separator 110b ensures that the first compressor 18 does not deplete the oil supply of the second compressor 20.

The oil separator 110b may be sized in a similar manner as 110a, as described above. In some circumstances, a commercial oil separator can be modified to be the oil separator 110b. More specifically, the commercial oil separator can be modified by moving the refrigerant outlet to match the location of the refrigerant outlet 144b as described above.

The sight glass 148b may be placed near the top of the first portion 154b. Thus, the oil level 146b is visible when the oil separator 110b has collected almost enough oil to supply the first compressor 18. A center of the sight glass 148b may be aligned with a second horizontal plane 158b. The second horizontal plane 158b may extend parallel to the first horizontal plane 152b and in the first portion 154b of the oil separator 110b. Greater than or equal to about 90% of a volume of the first portion 154b may be disposed below the second horizontal plane 158b as indicated at 160b, by way of non-limiting example.

With reference to FIG. 5, yet another oil separator 110c according to certain aspects of the present disclosure is provided. The oil separator 110c includes an inlet 140c, an oil outlet 142c, a refrigerant outlet 144c, and oil level 146c, and a sight glass 148c. The oil separator 110b further includes a vertical axis 150c similar to the vertical axis 150b of FIG. 4 and a first horizontal plane 152c similar to the first horizontal plane 152b of FIG. 4. The first horizontal plane 152c is disposed between a first portion 154c and a second portion 156c of the oil separator 156c. Like the sight glass 148b of FIG. 4, a center of the sight glass 148c may be aligned with a second horizontal plane 158c having greater than or equal to about 90% of the volume of the first portion 154c disposed thereunder, shown at 160c. The oil separator 110c may be similar to the oil separator 110b of FIG. 4. However, instead of having a similar volume to the oil separator 110a of FIG. 3 with a modified refrigerant outlet 144b location, the oil separator 110c has a smaller total volume than the oil separators 110a, 110b.

Figure 6:
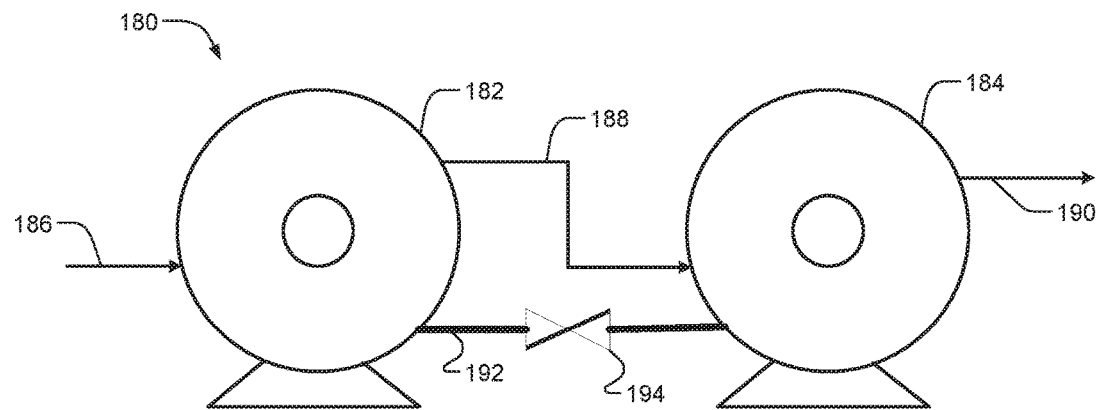
FIG. 6 is a schematic of an oil management system according to the present disclosure.

With reference to FIG. 6, an oil management system 180 according to certain aspects of the present disclosure is provided. The system 180 includes a first compressor 182 and a second compressor 184. The first and second compressors 182, 184 may be similar to the first and second compressors 18, 20 of FIG. 1. Refrigerant may enter the first compressor 182 through a first suction line 186. Refrigerant may exit the first compressor 182 through a first discharge line 188. The first discharge line 188 may direct refrigerant into the second compressor 184 such that it also serves as a second suction line. Refrigerant may exit the second compressor 184 through a second discharge line 190.

The system 180 may be free of distinct oil separators. Instead, the second compressor 184 may act as an oil separator. Oil may collect in an oil sump of the second compressor 184. A first oil sump of the first compressor 182 and the second oil sump of the second compressor 184 may be connected by an oil line 192 having a valve 194. The valve 194 may be opened to transfer oil between the first and second compressors 182, 184. More specifically, when the valve 94 is open, oil may flow through the oil line 192 from the higher-pressure second compressor 184 to the lower-pressure first compressor 182.

In various implementations, the system 180 may also include a two-way pump (not shown). Generally, when the valve 194 is open, oil flows from the second compressor 184 to the first compressor 182 because the first compressor 182 is at a lower pressure than the second compressor 184. However, in certain situations, it may be necessary to transfer oil from the lower-pressure first compressor 182 to the higher-pressure second compressor 184. It may be necessary to transfer oil from the first compressor 182 to the second compressor 184, for example, if oil tends to collect in the first compressor 182 after continued operation of the system 180. The two-way pump may move oil in a first direction from the first compressor 182 to the second compressor 184, or in a second direction from the second compressor 184 to the first compressor 182.

Figure 7:
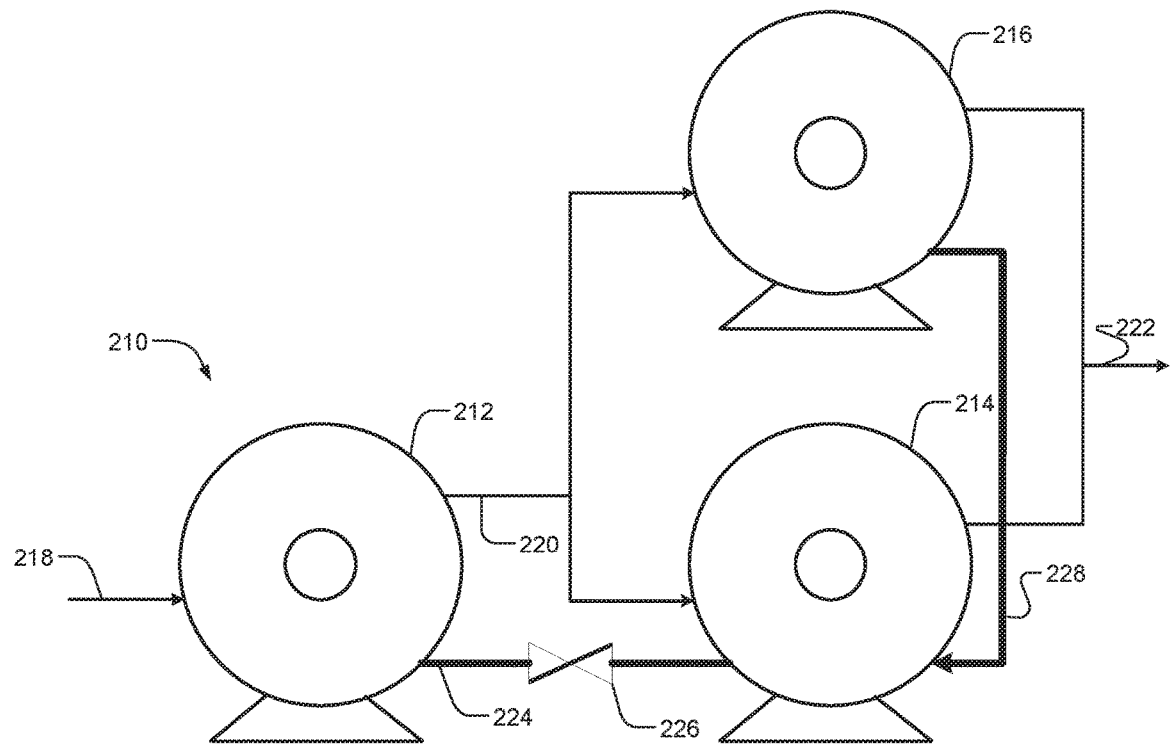
FIG. 7 is a schematic another oil management system according to the present disclosure.

In various implementations, the system 180 may include multiple first compressors 182 and/or multiple second compressors 184. When the system includes multiple first compressors 182, an oil balance tube may extend between each first compressor 182 (not shown). For example, the oil balance tube may connect respective sight glasses of each of the first compressors 182. With reference to FIG. 7, an oil management system 210 according to certain aspects of the present disclosure is provided. The system 210 includes a first compressor 212, a lead second compressor 214, and a secondary second compressor 216. The lead second compressor 214 runs more frequently than the secondary second compressor 216.

Refrigerant enters the first compressor 212 through a first suction line 218. Refrigerant exits the first compressor 212 through a first discharge line 220. The refrigerant in the first suction line 218 is directed to the second compressors 214, 216. Thus, the first discharge line 220 also functions as a second suction line. Refrigerant exits the second compressors 214, 216 through a second discharge line 222. Similar to the system 180 of FIG. 6, the system 210 may be free of distinct oil separators. First and second oil sumps of the first compressor 212 and the lead second compressor 214 may be connected by an oil line 224 and a valve 226, similar to the oil line 192 and valve 194 of FIG. 6.

In certain circumstances, the lead second compressor 214 may run while the secondary second compressor 216 is off. When the secondary second compressor 216 is off while the lead second compressor 214 is running, the lead compressor 214 may pull oil from the secondary second compressor 216. Thus, it may be necessary to equalize oil between the second compressors 214, 216. The second oil sump of the lead second compressor 214 and a third oil sump of the secondary second compressor 216 may be connected by an electronic or mechanical liquid level device 228. The liquid level device 228 may equalize oil between the lead second compressor 214 and the secondary second compressor 216.

Figure 8:
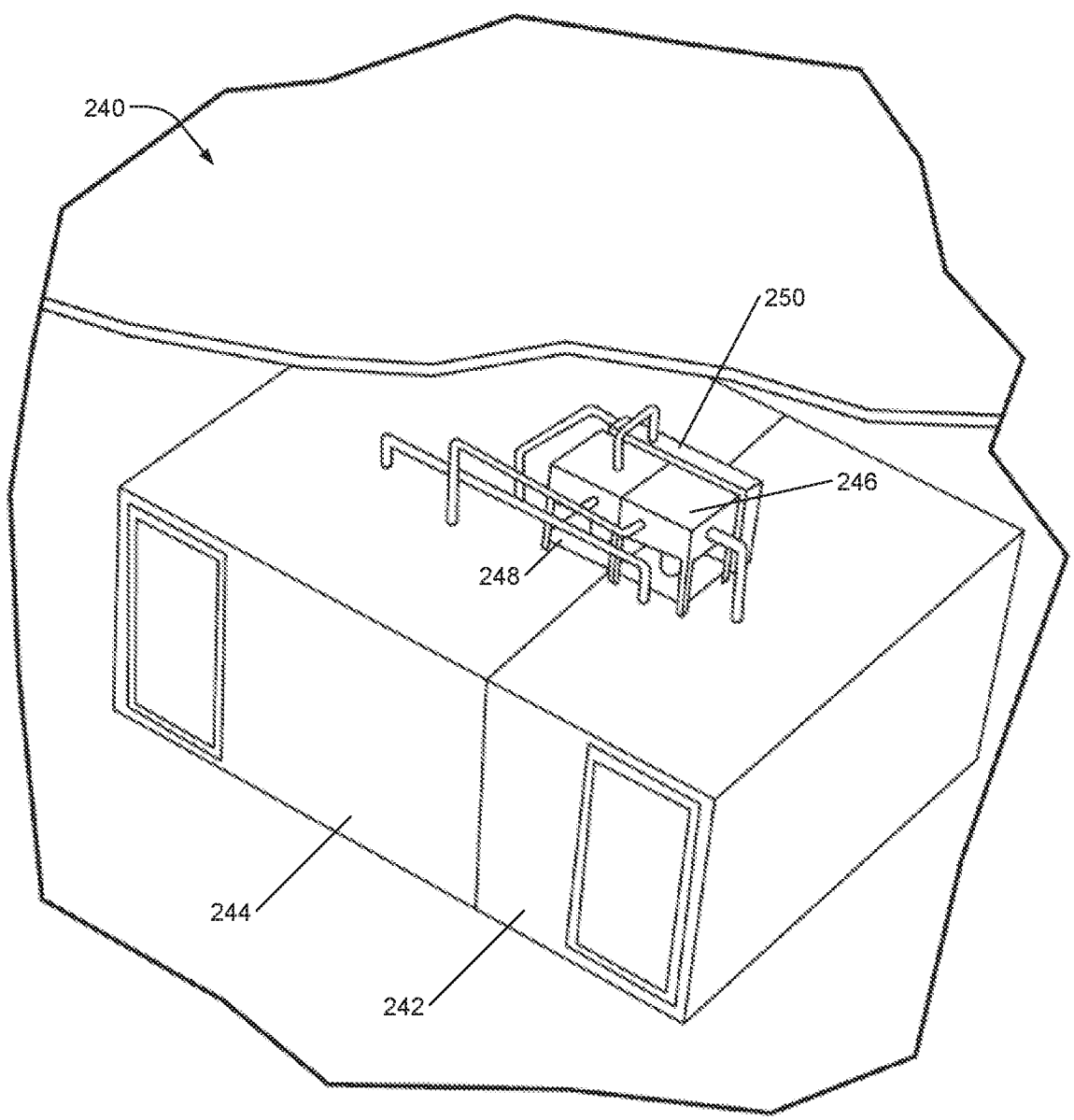
FIG. 8 is a perspective view of a micro booster refrigeration system according to the present disclosure.

The systems 180 of FIG. 6 and the system 210 of FIG. 7 may be particularly suitable for micro booster refrigeration systems having first and second compressors located in close proximity to one another. Referring to FIG. 8, an example micro booster refrigeration system 240 according to certain aspects of the present disclosure is provided. The refrigeration system 240 may include a first or dual temperature refrigeration case 242, a second or medium temperature refrigeration case 244, a first compressor 246, a second compressor 248, and a condenser 250. The first refrigeration case 242, second refrigeration case 244, first compressor 246, second compressor 248, and condenser 250 may be similar to the first refrigeration case 12, second refrigeration case 14, first compressor 18, second compressor 20, and condenser 22 of the refrigeration system of FIG. 1.

In one example, the first refrigeration case 242 may be a walk-in freezer or refrigerator/cooler and the second refrigeration case 244 may be a walk-in refrigerator/cooler. The first and second refrigeration cases 242, 244 may be disposed in close proximity to one another. For example, the first and second refrigeration cases 242, 244 may share a wall. Alternatively, a wall of the first refrigeration case 242 may abut a wall of the second refrigeration case 244. The first and second compressors 246, 248 may be disposed in close proximity to one another and to the first and second refrigeration cases 242, 244. For example, the first and second compressors 246, 248 may be disposed on top of the first and second refrigeration cases 242, 244, respectively. The system 240 is merely exemplary and other configurations having first and second compressors disposed in close proximity to one another are contemplated.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A refrigeration system comprising:
   at least one first compressor fluidly connected to a first suction line and a first discharge line;
   at least one second compressor fluidly connected to a second suction line and a second discharge line, the second suction line being fluidly connected to the first discharge line;
   a condenser operable to receive refrigerant from the at least one second compressor;
   a first evaporator operable to receive refrigerant from the condenser and discharge refrigerant to the first suction line;
   a second evaporator operable to receive refrigerant from the condenser and discharge refrigerant to the second suction line; and
   an first oil separator comprising a first inlet fluidly connected to the first discharge line, a first refrigerant outlet fluidly connected the second suction line, a first oil outlet fluidly connected to a first sump of the at least one first compressor, a first horizontal plane intersecting the first refrigerant outlet, wherein:
       the first oil separator is adapted to receive refrigerant and oil from the at least one first compressor through the first inlet and separate at least a portion of the oil from the refrigerant;
       a first portion of the first oil separator below the first horizontal plane is configured to collect separated oil;
       the first portion is sized to have a volume equal to a first compressor oil supply, the first compressor oil supply being greater than or equal to 100% of a first compressor initial oil charge and less than or equal to 250% of the first compressor initial oil charge;
       the at least one first compressor is configured to receive oil from the first oil outlet when an amount of oil in the first portion is less than or equal to the first compressor oil supply; and
       the at least one second compressor is configured to receive oil from the first refrigerant outlet when the amount of oil in the first portion is greater than the first compressor oil supply.

2. The refrigeration system of claim 1, further comprising a second oil separator comprising a second inlet fluidly connected to the second discharge line, a second refrigerant outlet fluidly connected the condenser, and a second oil outlet fluidly connected to a second sump of the at least one second compressor, wherein:
   the second oil separator is adapted to receive refrigerant and oil from the at least one second compressor through the second inlet and separate at least a portion of the oil from the refrigerant; and
   the at least one second compressor is configured to receive oil from the second oil outlet.

3. The refrigeration system of claim 2, wherein the first oil separator and the second oil separator are both completely charged.

4. The refrigeration system of claim 1, wherein the first oil separator further comprises a sight glass and a second horizontal plane, wherein:
   the second horizontal plane is disposed within the first portion and extends parallel to the first horizontal plane such that greater than or equal to 90% of a volume of the first portion is disposed below the second horizontal plane; and
   a center of the sight glass is aligned with the second horizontal plane.

5. The refrigeration system of claim 1, wherein:
the first sump is configured to contain the first compressor initial oil charge; and
the first compressor oil supply is greater than or equal to 100% of the first compressor initial oil charge and less than or equal to 225% of the first compressor initial oil charge.

6. The refrigeration system of claim 5, wherein the first compressor oil supply is greater than or equal to 175% of the first compressor initial oil charge and less than or equal to 225% of the first compressor initial oil charge.

7. The refrigeration system of claim 1, further comprising a valve disposed between the first evaporator and the first suction line, wherein:
the first suction line receives refrigerant from the first evaporator when the valve is in a first position;
the second suction line receives refrigerant from the first evaporator when the valve is in a second position; and
the at least one first compressor is bypassed when the valve is in the second position.

8. The refrigeration system of claim 7, further comprising:
a first refrigeration case operable to be cooled by the first evaporator within a first temperature range when the valve is in a first position and within a second temperature range when the valve is in the second position, the first temperature range being lower than the second temperature range; and
a second refrigeration case operable to be cooled by the second evaporator within the second temperature range.

9. A refrigeration system comprising:
at least one first compressor fluidly connected to a first suction line and a first discharge line;
at least one second compressor fluidly connected to a second suction line and a second discharge line, the second suction line being fluidly connected to the first discharge line;
a condenser operable to receive refrigerant from the at least one second compressor;
a first evaporator operable to receive refrigerant from the condenser and discharge refrigerant to the first suction line;
a second evaporator operable to receive refrigerant from the condenser and discharge refrigerant to the second suction line;
a first valve disposed between the first evaporator and the first suction line; and
an oil line extending between a first oil sump of the at least one first compressor and a second oil sump of the at least one second compressor, the oil line comprising a two-way pump configured to move oil in a first direction from the second oil sump to the first oil sump or a second direction from the first oil sump to the second oil sump, wherein:
the first suction line receives refrigerant from the first evaporator when the first valve is in a first position;
the second suction line receives refrigerant from the first evaporator when the first valve is in a second position;
the at least one first compressor is bypassed when the first valve is in the second position; and
the refrigeration system is free of a distinct oil separator.

10. The refrigeration system of claim 9, further comprising:
a first refrigeration case operable to be cooled by the first evaporator within a first temperature range when the first valve is in a first position and within a second temperature range when the first valve is in the second position, the first temperature range being lower than the second temperature range; and
a second refrigeration case operable to be cooled by the second evaporator within the second temperature range.

11. The refrigeration system of claim 10, wherein:
the first refrigeration case comprises a walk-in freezer;
the second refrigeration case comprises a walk-in cooler;
the first refrigeration case and the second refrigeration case are disposed directly adjacent to one another within a retail space; and
the at least one first compressor and the at least one second compressor are disposed directly adjacent to one another in the retail space.

12. The refrigeration system of claim 11, wherein:
the at least one first compressor is at least one of disposed within the first refrigeration case, disposed on the first refrigeration case, disposed under the first refrigeration case, disposed adjacent to the first refrigeration case, and attached to the first refrigeration case; and
the at least one second compressor is at least one of disposed within the second refrigeration case, disposed on the second refrigeration case, disposed under the second refrigeration case, disposed adjacent to the second refrigeration case, and attached to the second refrigeration case.

13. The refrigeration system of claim 9, wherein the at least one first compressor comprises two first compressors having respective first oil sumps, the first oil sumps being connected by an oil balance tube.

14. The refrigeration system of claim 9, wherein the at least one second compressor comprises two second compressors having respective second oil sumps, the second oil sumps being connected by an oil balance tube.

15. A refrigeration system comprising:
a single first compressor fluidly connected to a first suction line and a first discharge line;
at least one second compressor fluidly connected to a second suction line and a second discharge line, the second suction line being fluidly connected to the first discharge line, the at least one second compressor comprising a lead second compressor and a secondary second compressor;
a condenser operable to receive refrigerant from the at least one second compressor;
a first evaporator operable to receive refrigerant from the condenser and discharge refrigerant to the first suction line;
a second evaporator operable to receive refrigerant from the condenser and discharge refrigerant to the second suction line;
a first valve disposed between the first evaporator and the first suction line;
an oil line extending between a first oil sump of the single first compressor and a second oil sump of the lead second compressor; and
an oil balance tube connecting the second oil sump and a third oil sump of the secondary second compressor, wherein:
the first suction line receives refrigerant from the first evaporator when the first valve is in a first position;
the second suction line receives refrigerant from the first evaporator when the first valve is in a second position; and
the single first compressor is bypassed when the first valve is in the second position.

16. The refrigeration system of claim 15, wherein the lead second compressor and the secondary second compressor are connected in parallel.

\* \* \* \* \*